United States Patent Office 3,563,800
Patented Feb. 16, 1971

3,563,800
RECHARGING ALKALINE/ZINC CELLS
Harry G. Oswin, Chauncey, and Keith F. Blurton, Hempstead, N.Y., assignors to Leesona Corporation, Warwick, R.I., a corporation of Massachusetts
Filed June 19, 1968, Ser. No. 738,229
Int. Cl. H01m 41/02
U.S. Cl. 136—30
11 Claims

ABSTRACT OF THE DISCLOSURE

An improved method of recharging a secondary battery utilizing a zinc anode is described comprising maintaining the current density during charging above the critical current density and pulse charging, i.e., charging with a periodic cut-off of current, with the on time being no greater than 200 milliseconds.

FIELD OF INVENTION AND PRIOR ART

Figure 1:
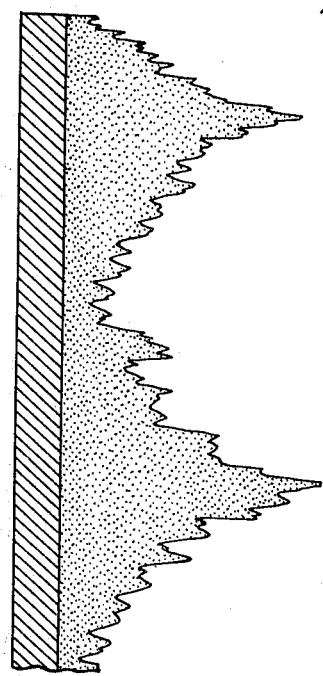

This invention is directed to secondary batteries. More particularly, this invention is directed to an improved method of recharging secondary batteries utilizing a zinc anode.

Galvanic cells comprising a zinc anode in conjunction with an alkaline hydroxide electrolyte and known metal cathodes, such as a porous silver cathode, are highly desirable in view of the high current output theoretically obtainable. More recently, zinc/air cells have received wide recognition in view of their high energy:density ratio, high current capacity and their rapid discharge rate. However, the rechargeability of the aforesaid cells is limited in that the product of zinc discharge, namely zinc oxide, is readily soluble in the alkaline electrolyte as the zincate ion. During the charge portion of the cycle, the zinc of the zincate ion is normally plated out to a greater or lesser extent in the form of dendrites. More specifically, during discharge of the zinc electrode three reactions can occur:

(1) 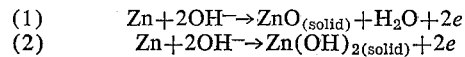

(2) 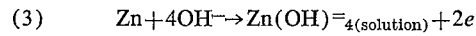

and (3) 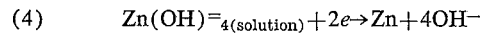

Dendrites occur during the charge portion of the cycle as a result of the reverse of Reaction 3, i.e.

(4) $Zn(OH)=_{4(solution)} + 2e \rightarrow Zn + 4OH^-$

Two main types of dendrites, mossy and crystalline, can form depending upon whether the process is activation or diffusion-controlled, respectively. The crystalline variety is the most undesirable dendritic growth and is often responsible for early failure of the galvanic cell due to shorting, loss of capacity due to break away of active material from the negative plate causing variability of performance and limited cycle life. The mossy variety is undesirable, primarily in that the moss does not adhere to the primary electrode, flaking off and again causing variability of performance and limited cycle life.

Although the problem of dendrite growth has been actively investigated in the battery art for a number of years and a number of solutions suggested, including various modifications in the charging technique and/or the incorpation of additives to the zinc anode and electrolyte of the cell, no completely acceptable solution has been advanced to date.

OBJECTS AND GENERAL DESCRIPTION OF INVENTION

Accordingly, it is an object of the present invention to provide an improved method of recharging conventional electrochemical cells utilizing a zinc anode, an alkaline electrolyte and a cathode which substantially eliminates dendrite formation.

It is another object of this invention to provide an improved method of recharging an electrochemical cell utilizing a zinc anode without formation of dendrites whereby the cell is effectively fully recharged utilizing a minimum of energy and permits the recharging in a relatively short period of time.

These and other objects of the invention will be more readily apparent from the following detailed description, with particular emphasis being placed upon the examples and drawings.

In accordance with the present invention, the dendrite formation in a rechargeable or secondary electrochemical cell comprising a zinc anode, an alkaline electrolyte and a cathode can be eliminated or substantially minimized by controlling the charging current density and the application of the controlled current density to the electrochemical cell. More specifically, it has been discovered that dendrite growth can be eliminated, or substantially minimized, by maintaining a charging current density above a critical level and pulse charging, i.e. charging with a periodic cutoff of current. The on and off time of the pulse charging is critical to the extent that the on time can be no greater than about 200 milliseconds, and preferably is as short as practical. Moreover, the off period, again within practical limits, is to be as long as possible and in no event less than 0.5 of the on period. As the term is employed herein, "critical current density" is dependent upon temperature and the geometric surface area of the electrode and is defined as the transition region at a select temperature below which mossy, non-adherent zinc dendritic deposits occur and above which crystalline dendritic growth occurs. This critical current density increases with increasing temperature corresponding to an increase in the diffusion coefficient. More specifically, the mossy dendrites are a result of surface effects or are activation controlled. Mass transfer does not apply in view of the low current density at which the charging occurs. Crystalline dendrite formation is also dependent upon the surface of the anode. However, propagation is due to depletion of the zincate ion at the electrode surface. The preferential growth of the dendrite tips occurs under conditions of concentration polarization when the asperities or high points protrude into the electrolyte beyond the average surface level. Being nearer to the reservoir of soluble species, these tips grow more rapidly than the lower "starved" surface areas. Pulse charging controls this depletion provided the charging current density is above the critical value and the on time is regulated. The short on time, while depleting the zinc ion concentration at the anode surface, does not cause depletion sufficient to lead to dendritic growth. The off time permits the zinc ion concentration to again become uniform at the anode surface and accordingly, should be as long as possible within practical limits from the standpoint of total charge time. The on period, to obtain beneficial results, must not be longer than 200 milliseconds, with the on time preferentially being less than 125 milliseconds and the optimum beneficial results occurring at 50 milliseconds or less. The off period is preferentially twice as long or longer than the on period and in no event less than 0.5 of the on time. A practical trade-off is the utilization of equal on and off times.

The critical current density of zinc is above 15 milliamps per cm.² of geometric surface area at ambient conditions. Accordingly, the optimum charging current density will be from 15 milliamps per cm.$^2$ of geometric surface, with a practical upper limit being 1 amp. per cm.$^2$. Below about 15 milliamps per cm.$^2$ crystalline dendrites, being dependent upon mass transfer, are not a problem. At current densities above about 1 amp. per cm.$^2$ a roughening of the electrode surface is obtained, apparently due to mass transfer effects. This roughening which is a type of dendritic growth, can lead to shorting of the cell or the like. A current density of from about 25–45 ma./cm.$^2$ is preferred, with 40 being the optimum from the standpoint of obtaining a smooth, uniform surface.

As apparent, the pulsing technique does not increase the amount of energy consumed, and in fact, because of the optimum charge conditions as a result of the off period permitting uniform zincate concentration, provides much more efficient utilization of the total electrical current applied. For example, current efficiencies for deposition range from about 85–98%.

The beneficial results of the described recharging are obtained with any alkaline electrolyte, whether free-flowing or trapped in a matrix. However, since the mass diffusion or mass transfer effects are enhanced by the convective currents in the electrolyte, the optimum benefits are realized when a free-flowing electrolyte is used. Furthermore, circulation of the electrolyte can be advantageous in that normally the zincate ions being heavier than the alkaline hydroxide electrolyte have a tendency to settle to the bottom of the cell causing proportionately faster mass propagation at the bottom of the anode and faster dendrite propagation at the top of the anode. By employing the pulse charging technique, however, the need for a circulating electrolyte is minimized or substantially eliminated.

DRAWINGS AND EXAMPLES

Figure 2:
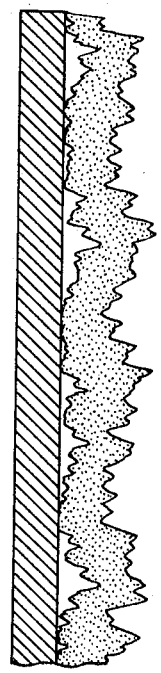
Figure 3:
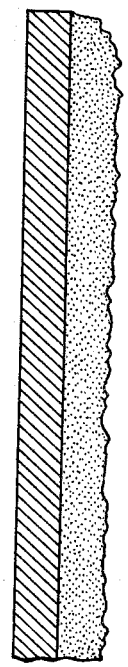

Having described the invention in general terms, the following examples, with particular reference to the drawing, will be set forth to more fully illustrate the invention. In the drawings, FIG. 1 is an enlarged cross-section of an electrode showing the nature of the zinc growth utilizing a continuous direct current density of 40 milliamps per cm.$^2$ of geometric electrode surface area. FIG. 2 is an enlarged cross-section of an electrode showing the nature of the zinc growth when employing a current density of 4 milliamps per cm.$^2$ and pulse charging, and FIG. 3 is an enlarged cross-section of an electrode illustrating the smooth and even distribution of the zinc deposit when using controlled pulse charging at a current density above the critical level.

EXAMPLE I

A conventional silver/zinc cell is constructed using a 43% aqueous potassium hydroxide electrolyte solution. The negative electrode employed comprises sheet zinc having a surface area of 22 cm.$^2$. The counter-electrode is sheet silver having a surface area of 22 cm.$^2$. After discharging, a constant or continuous charging direct current of 40 milliamps per cm.$^2$ was applied with the charging being continued until 18 coulombs per cm.$^2$ had been applied. The zinc electrode was removed from the cell and photomicrographs taken. The dendritic growth is crystalline, with sharp protrusions as shown in FIG. 1.

EXAMPLE II

A cell is constructed substantially identical to the cell described in Example I. However, in this instance, after discharging a charging current density of 4 milliamps per cm.$^2$ is applied by means of a pulsing current, 25 seconds on and 25 seconds off, until a total of 18 coulombs per cm.$^2$ of electrode area was applied. The zinc electrode was removed from the cell and examined by means of photomicrographs to show a mossy, non-adherence dendritic growth of the type shown in FIG. 2. Approximately 3.1 coulombs per cm.$^2$ was applied before the mossy growth started to appear. The adherent zinc amounted to 4 coulombs per cm.$^2$ and the non-adherent deposit 14.0 coulombs per cm.$^2$.

EXAMPLE III

Another cell was constructed substantially as described in Example I. In this instance, after discharging a charging current density of 40 milliamps per cm.$^2$ was applied by the pulsing technique, with the on time being 10 milliseconds and the off time being 10 milliseconds. A total of 60 coulombs per cm.$^2$ was applied with the current efficiency for deposition being 85%. A smooth, adherence deposit as shown in FIG. 3 was obtained.

EXAMPLE IV

A conventional silver/zinc cell is constructed utilizing a 43% aqueous sodium hydroxide electrolyte solution. The negative electrode employed comprises a porous zinc structure having a porosity of 75%, and the positive electrode comprises a porous silver structure having a porosity of 60%. The zinc electrode is prepared by slurrying zinc metal particles with water, compacting at a pressure of 100 p.s.i. to remove most of the water, drying at 100° C. for a period of 60 minutes, and thereafter bonding the zinc particles at a temperature of 280° C. for 40 minutes. The silver electrode is formed in like manner. However, the final sintering is performed at a temperature of 530° C. for 55 minutes. After sintering, the electrode is oxidized anodically in 30% aqueous KOH to form the silver oxide. The negative and positive electrodes are electrically separated by a fibrous cellulose membrane which contains the potassium hydroxide electrolyte. The cell was continuously discharged and charged for a total of 20 cycles, with the charging being carried out at a current density of 40 milliamps per cm.$^2$ geometric surface area of the zinc and the charge applied by a pulsing technique 50 milliseconds on and 500 milliseconds off. At the end of the 20 cycles the cell performed without indication of substantial degradation.

An air battery was constructed comprising a porous zinc anode having a conductive screen extending the length of the anode and wrapped with fiber-reinforcing cellulose and a composite cathode comprising a polytetrafluoroethylene membrane in intimate contact with a conductive nickel screen and a layer of uniformly mixed polytetrafluoroethylene particles and platinum black. The loading of platinum in the catalyst layer was approximately 7 mgs. platinum per cm.$^2$ of the cathode surface. The catalytic layer of the cathode was in intimate contact with the reinforced cellulose wrapped around the anode. The cellulose wrap was impregnated with 28% aqueous potassium hydroxide electrolyte solution. The unit was sealed from the top to provide a fluid-tight cell. The cell was subjected to continuous charge and discharge cycles for a total of 20 cycles, with the charging being carried out at a current density of 35 milliamps per cm.$^2$ geometric surface area of the zinc, and the current applied by the pulsing technique 10 milliseconds on and 20 milliseconds off. At the end of the 20 cycles no noticeable deterioration in performance was observed.

In the aforesaid examples the current density can be varied from 15 milliamps per cm.$^2$ upward, with a practical upper limit being about 1 amp. per cm.$^2$. Additionally, the pulsing periods can be modified within the upper limit of 200 milliseconds of on time. The electrolyte utilized in the cell can be any alkaline hydroxide electrolyte, including sodium hydroxide, cesium hydroxide, rubidium hydroxide, lithium hydroxide, mixtures thereof, as well as the alkaline earth hydroxides, such as calcium hydroxide, strontium hydroxide, barium hydroxide and the like. Furthermore, although from the practical considerations ambient conditions are preferred for the recharging operation, charging at higher temperatures is permissible and increases the ionic mass transfer.

It should be appreciated that the instant invention is not to be construed as being limited by the illustrative examples. It is possible to produce still other embodiments without departing from the inventive concept herein disclosed. Such embodiments are within the ability of one skilled in the art.

What is claimed is:

1. An improved method for recharging an electrochemical system for generating electricity comprising an electrochemical cell comprising a cathode member, a zinc anode, and an alkaline electrolyte therebetween; said method including pulse charging said cells by applying a controlled current density above about 15 ma./cm.$^2$ of geometric zinc surface area, the on period of the pulse charging being no greater than about 200 milliseconds and the off period being no less than 0.5 of the on period.

2. The method of claim 1 wherein the on period of the pulse charging is no greater than 125 milliseconds and the off period is at least equal to the on period.

3. The method of claim 1 wherein the on period of the pulse charging is no greater than 50 milliseconds and the off period is at least equal to the on period.

4. The method of claim 1 wherein the current density is from about 25 to 45 milliamps per cm.$^2$ of geometric zinc surface area.

5. The method of claim 1 wherein the current density is above about 15 milliamps per cm.$^2$ and no greater than one ampere per cm.$^2$.

6. The method of claim 1 wherein the electrolyte is potassium hydroxide.

7. The method of claim 1 wherein the electrolyte is in free-flowing form.

8. The method of claim 1 wherein the electrolyte is trapped in a hydrophilic matrix.

9. The method of claim 1 wherein the cell is a zinc/air cell including a cathode member comprising an air permeable, liquid impermeable supporting membrane coated with electrocatalyst, and the electrolyte comprises an alkaline metal hydroxide.

10. The method of claim 1 wherein the cell is a silver/zinc cell.

11. The method of claim 1 wherein the off period of the pulse charging ranges from one-half to about twice the on period.

References Cited

UNITED STATES PATENTS

| 2,443,599 | 6/1948 | Chester | 204—228 |
| 3,258,671 | 6/1966 | Wales | 136—30 |
| 3,455,741 | 7/1969 | Schneider | 136—75 |

FOREIGN PATENTS

| 173,279 | 7/1965 | Russia | 136—30 |

ALLEN B. CURTIS, Primary Examiner

LeFEVOUR, Assistant Examiner

U.S. Cl. X.R.

136—86, 164; 320—21